US012581187B2

(12) United States Patent
Enomoto

(10) Patent No.: US 12,581,187 B2
(45) Date of Patent: Mar. 17, 2026

(54) IMAGE PICKUP APPARATUS CONTROLLING AN OPERATING MODE, ITS CONTROL METHOD, AND STORAGE MEDIUM

(71) Applicant: CANON KABUSHIKI KAISHA, Tokyo (JP)

(72) Inventor: Daisuke Enomoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 76 days.

(21) Appl. No.: 18/585,314

(22) Filed: Feb. 23, 2024

(65) Prior Publication Data

US 2024/0340531 A1     Oct. 10, 2024

(30) Foreign Application Priority Data

Apr. 7, 2023     (JP) ................................. 2023-063096

(51) Int. Cl.
*H04N 23/667*          (2023.01)
*H04N 23/65*           (2023.01)
*H04N 23/90*           (2023.01)

(52) U.S. Cl.
CPC ......... *H04N 23/667* (2023.01); *H04N 23/651* (2023.01); *H04N 23/90* (2023.01)

(58) Field of Classification Search
CPC ........................... H04N 23/667; H04N 23/651
USPC ....................................................... 348/262
See application file for complete search history.

(56) References Cited

U.S. PATENT DOCUMENTS

| 2014/0104453 A1* | 4/2014 | Fujinawa ............... H04N 23/80 |
| | | 348/222.1 |
| 2018/0109804 A1* | 4/2018 | Saeedi ................. H04N 19/139 |
| 2022/0179665 A1* | 6/2022 | Rathod ................... G06F 9/451 |

FOREIGN PATENT DOCUMENTS

| CN | 104052932 A | * | 9/2014 | .......... H04N 23/673 |
| CN | 117278839 A | * | 12/2023 | |
| JP | 2004312477 A | | 11/2004 | |
| KR | 20060105004 A | * | 10/2006 | ............. H04N 23/60 |

* cited by examiner

*Primary Examiner* — Lin Ye
(74) *Attorney, Agent, or Firm* — Cowan, Liebowitz & Latman, P.C.

(57) ABSTRACT

An image pickup apparatus includes a first imaging unit configured to acquire an object image, a second imaging unit configured to acquire an image of the image pickup apparatus in an imaging area on a rear side of the image pickup apparatus, a motion detector configured to detect a motion of the image pickup apparatus, a first determining unit configured to determine that an imaging preparation operation for acquiring the object image has been started by a user based on the image acquired by the second imaging unit in a case where a first motion is detected by the motion detector, and a second determining unit configured to determine whether the motion detector detects a second motion after the first determining unit determines that the imaging preparation operation has been started by the user.

9 Claims, 3 Drawing Sheets

102

100

100

101

IMAGE PICKUP APPARATUS CONTROLLING AN OPERATING MODE, ITS CONTROL METHOD, AND STORAGE MEDIUM

BACKGROUND

Technical Field

One of the aspects of the embodiments relates to an image pickup apparatus.

Description of Related Art

Prior art enables an electronic apparatus to be immediately used from a standby state by powering on the electronic apparatus at a timing suitable for the user's intent.

Japanese Patent Laid-Open No. 2004-312477 discloses a technology that detects a change in the attitude of a camera body and automatically powers on an image pickup apparatus.

However, the technology disclosed in Japanese Patent Laid-Open No. 2004-312477 is not related to the technology for imaging the photographer, and cannot acquire the state of the photographer in imaging an object. Thus, the image pickup apparatus disclosed in Japanese Patent Laid-Open No. 2004-312477 cannot control the operating state of the image pickup apparatus in accordance with the imaging intent of the photographer.

SUMMARY

An image pickup apparatus according to one aspect of the disclosure includes a first imaging unit configured to acquire an object image, a second imaging unit configured to acquire an image of the image pickup apparatus in an imaging area on a rear side of the image pickup apparatus, a motion detector configured to detect a motion of the image pickup apparatus, a first determining unit configured to determine that an imaging preparation operation for acquiring the object image has been started by a user based on the image acquired by the second imaging unit in a case where a first motion is detected by the motion detector, and a second determining unit configured to determine whether the motion detector detects a second motion after the first determining unit determines that the imaging preparation operation has been started by the user. A control method corresponding to the image pickup apparatus also constitutes another aspect of the disclosure. A storage medium storing a program that causes a computer to execute the above control method also constitutes another aspect of the disclosure.

Further features of various embodiments of the disclosure will become apparent from the following description of embodiments with reference to the attached drawings.

DESCRIPTION OF THE EMBODIMENTS

Figure 1A:
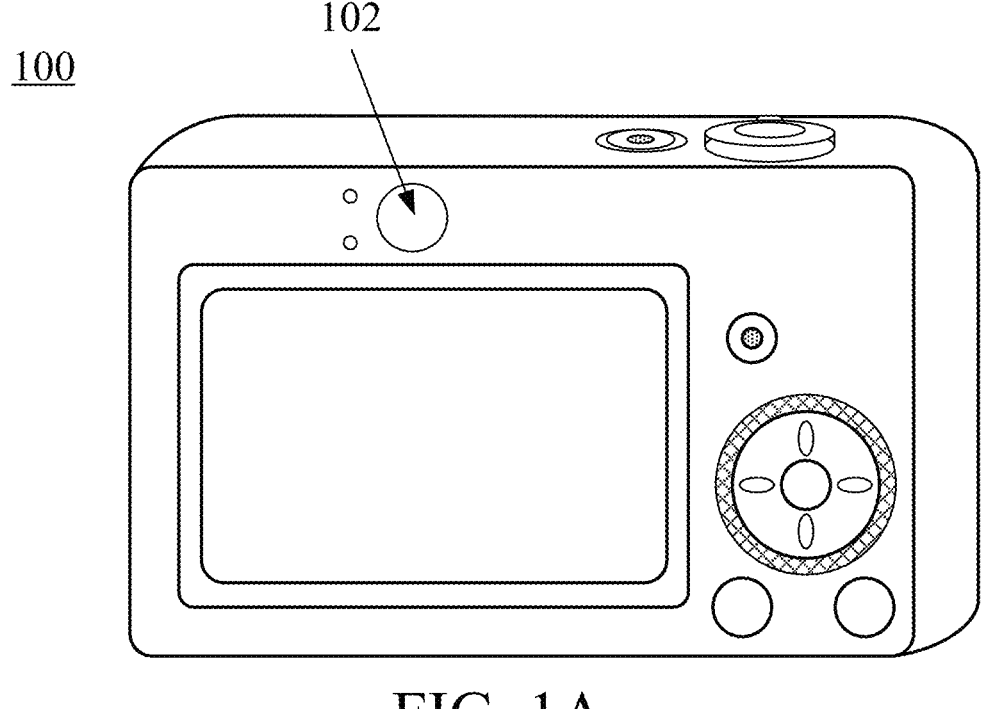
FIGS. 1A and 1B are external views of an image pickup apparatus according to this embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted. The configurations described in the embodiment below are merely illustrative, and the scope of this disclosure is not limited by the configuration described in the embodiment.

Referring now to FIGS. 1A, 1B, 2, and 3, a description will be given of an image pickup apparatus 100 according to this embodiment.

Overview of Image Pickup Apparatus

Figure 1B:
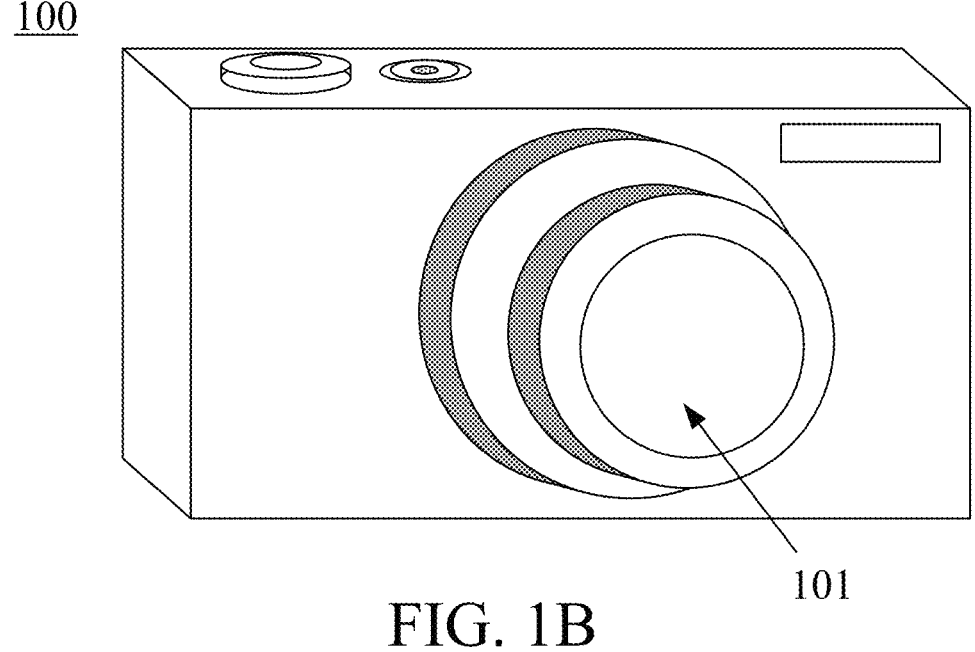

FIGS. 1A and 1B are external views of the image pickup apparatus 100 according to this embodiment. FIG. 1A is a rear view of the image pickup apparatus 100, and FIG. 1B is a front perspective view of the image pickup apparatus 100. The image pickup apparatus 100 includes a first imaging unit 101 and a second imaging unit 102. As illustrated in FIG. 1B, the first imaging unit 101 is provided to the front side of the image pickup apparatus 100 and acquires an object image. The first imaging unit 101 includes an imaging lens. The object image is formed on an unillustrated image sensor via the imaging lens. As illustrated in FIG. 1A, the second imaging unit 102 is provided on the rear side of the image pickup apparatus 100, and acquires an image of a photographer (user operating the image pickup apparatus 100) in an imaging area provided on the rear side of the image pickup apparatus 100. In other words, the second imaging unit 102 acquires an image in the direction of the photographer. This captured image in the direction of the photographer may or may not include the photographer.

Functional Configuration

Figure 2:
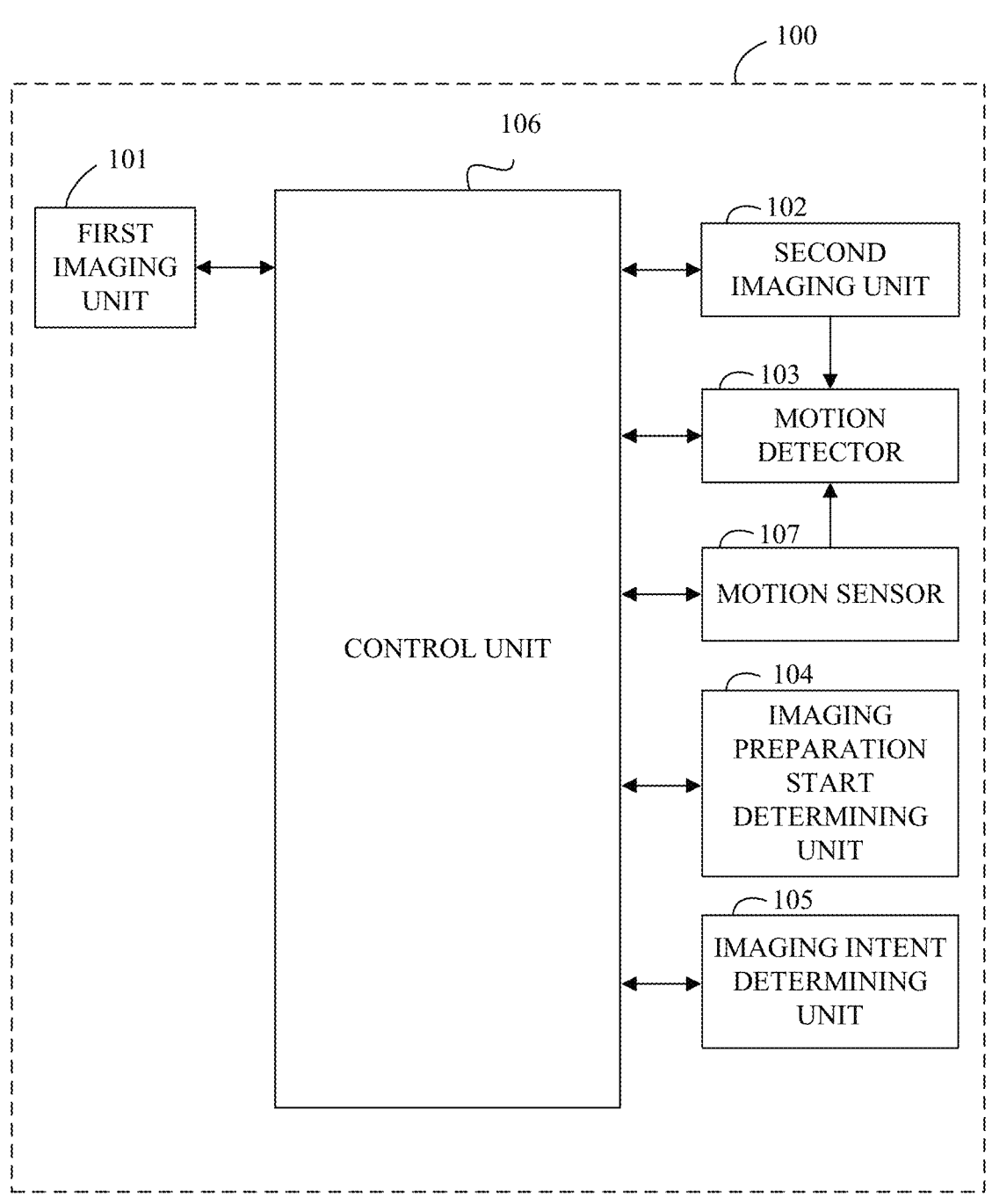
FIG. 2 is a block diagram illustrating the functional configuration of the image pickup apparatus according to this embodiment.

FIG. 2 is a block diagram illustrating the functional configuration of the image pickup apparatus 100. The image pickup apparatus 100 includes the first imaging unit 101 configured to acquire (capture) an object image, and the second imaging unit 102 configured to acquire (capture) an image of a user in the imaging area provided on the rear side of the image pickup apparatus 100. The image pickup apparatus 100 further includes a motion detector 103, an imaging preparation start determining unit (first determining unit) 104, an imaging intent determining unit (second determining unit) 105, and a control unit 106. Each processing in this embodiment is executed by the control unit 106, which is a processor, such as a CPU, configured to control the entire image pickup apparatus 100 by loading a program recorded in an unillustrated nonvolatile memory into an unillustrated system memory. The first imaging unit 101 and the second imaging unit 102 illustrated in FIG. 2 have the same functions as the first imaging unit 101 and the second imaging unit 102 described with reference to FIGS. 1A and 1B, and a duplicate description thereof will be omitted.

The motion detector 103 detects the motion of the image pickup apparatus 100 by calculating a motion vector between images acquired by the second imaging unit 102. More specifically, in a case where a downward motion vector is calculated from images acquired by the second imaging unit 102, the motion detector 103 detects an upward motion of the image pickup apparatus 100 (for example, the motion of the image pickup apparatus 100 lifted by the photographer). In a case where the image pickup apparatus 100 is lifted by the photographer, the downward motion vector is calculated from the images acquired by the second imaging unit 102, but if the image pickup apparatus 100 is tilted, the calculated motion vector is not directly below. Therefore, this embodiment regards a motion vector including a downward component as a downward motion vector. In addition, in a case where the motion vector amount calculated from images acquired by the second imaging unit 102 is smaller than a predetermined amount, the motion detector 103 determines that the image pickup apparatus 100 is not moving (for example, the image pickup apparatus 100 is held by the photographer and is not moving (is stationary)).

In a case where a predetermined motion (first motion) is detected by the motion detector 103, the imaging preparation start determining unit 104 determines that the photographer has started the imaging preparation to acquire an object image based on the image in the direction toward the photographer acquired by the second imaging unit 102. In this embodiment, the imaging preparation start determining unit 104 determines that the photographer has started the imaging preparation in a case where the motion detector 103 has detected an upward movement of the image pickup apparatus 100 by a predetermined amount or more and then the photographer's face is included in the captured image acquired by the second imaging unit 102. The determination of whether the photographer has started the imaging preparation uses the presence or absence of the photographer's face in the acquired image, but the presence or absence of something other than the face may be used as long as it is a feature portion of the photographer, such as an eye, nose, and mouth included in the photographer's face.

The imaging intent determining unit 105 determines that the photographer has an imaging intent in a case where the motion detector 103 has detected the motion (second motion) of the image pickup apparatus 100 after the imaging preparation start determining unit 104 determines that the photographer has started the imaging preparation. In other words, the imaging intent determining unit 105 is configured to determine whether the motion detector 103 detects the second motion after the imaging preparation start determining unit 104 determines that the imaging preparation operation has been started by the user. In this embodiment, in a case where the motion detector 103 detects that the image pickup apparatus 100 is stationary, the imaging intent determining unit 105 determines that the photographer has an imaging intent. On the other hand, in a case where the motion detector 103 does not detect that the image pickup apparatus 100 is stationary, the imaging intent determining unit 105 determines that the photographer has no imaging intent.

The first imaging unit 101 and the second imaging unit 102 are controlled by the control unit 106 to one of the following operating modes: "normal imaging mode," "power saving mode," and "imaging stop mode." The image pickup apparatus 100 is in a lower power consumption state when it is in the power saving mode than when it is in the normal imaging mode. The normal imaging mode is an imageable mode (that can provide imaging of an object). The power saving mode is an imageable mode with power consumption lower than that of the normal imaging mode. The imaging stop mode is a mode for stopping the imaging of an object. For example, in a state in which the image pickup apparatus 100 displays a live-view image (object through image), the power saving mode reduces the read cycle and pixel resolution of the live-view image. Thereby, the power saving mode can be set to a power consumption state lower than that of the normal imaging mode. For example, the imaging stop mode stops the driving operation of the live-view image and the power supply to the first imaging unit 101. Thereby, the imaging stop mode is set to a lower power consumption state. The image pickup apparatus 100 is in a lower power consumption state when it is in the imaging stop mode than when it is in the power saving mode. In other words, in terms of power consumption, the imaging stop mode consumes the least power amount. The mode with the second lowest power consumption is the power saving mode, and the mode with the highest power consumption is the normal imaging mode.

The control unit 106 controls the power states of the first imaging unit 101 and the second imaging unit 102, and may change the power state of the first imaging unit 101 from the first state to a second state in a case where the imaging intent determining unit 105 determines that the photographer has an imaging intent. The second state consumes power higher than that of the first state. For example, the first state is the power saving mode that consumes less power than the normal imaging mode, or the imaging stop mode, and the second state is the normal imaging mode.

Operation Example

Figure 3:
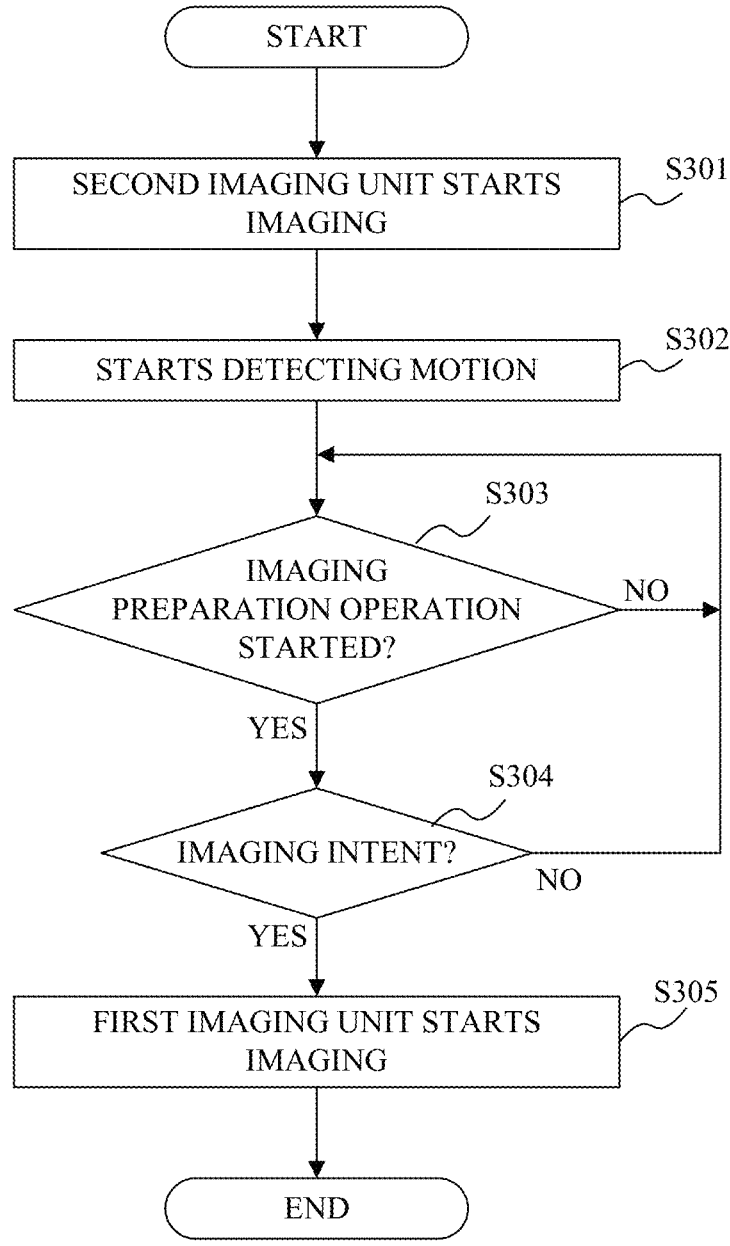
FIG. 3 is a flowchart illustrating the operation of the image pickup apparatus according to this embodiment.

Referring now to FIG. 3, a description will be given of the operation of the image pickup apparatus 100. The processing in this flowchart starts from a state in which the first imaging unit 101 is set to the imaging stop mode by the control unit 106 according to a predetermined condition, such as that no operation of the image pickup apparatus 100 by the photographer for a predetermined period or longer. At this time, the second imaging unit 102 is controlled by the control unit 106 to be in the imaging stop mode.

First, in step S301, the control unit 106 changes the operation mode of the second imaging unit 102 to the normal imaging mode and causes the second imaging unit 102 to start imaging the image pickup apparatus 100 in the direction of the photographer.

Next, in step S302, the control unit 106 causes the motion detector 103 to start detecting the motion of the image pickup apparatus 100. In this embodiment, the motion detector 103 receives as input a captured image in the direction toward the photographer acquired by the second imaging unit 102, calculates a motion vector, and detects the motion of the image pickup apparatus 100.

Next, in step S303, the control unit 106 causes the imaging preparation start determining unit 104 to determine whether or not the photographer has started the imaging preparation operation. More specifically, the imaging preparation start determining unit 104 determines that the imaging preparation operation has been started in a case where both of the following two conditions are satisfied:

First, the motion detector 103 detects a motion in an upward direction (or vertical direction) of the image pickup apparatus 100 by a predetermined amount or more.

Second, the image captured by the second imaging unit 102 in the direction toward the photographer includes the photographer's face.

On the other hand, in a case where either of the two conditions is not satisfied, the imaging preparation start determining unit 104 determines that the imaging preparation operation has not been started. In a case where the imaging preparation start determining unit 104 determines that the imaging preparation operation has been started (Yes in S303), the flow proceeds to step S304. In a case where the imaging preparation start determining unit 104 determines that the imaging preparation operation has not been started (No in S303), the flow returns to step S303.

Next, in step S304, the control unit 106 causes the imaging intent determining unit 105 to determine whether or not the photographer has an imaging intent. More specifically, in step S304, in a case where it is determined that the image pickup apparatus 100 is not moving based on the motion detecting result of the motion detector 103 (Yes in step S304), the imaging intent determining unit 105 determines that the photographer has an imaging intent. In step S304, since the instantaneous motion detecting result of the motion detector 103 cannot accurately determine whether or not the photographer has the imaging intent, the motion detecting result of the motion detector 103 for the predetermined period (such as 1 second) may be used for the determination. The flow then proceeds to step S305. In step S305, the control unit 106 changes the operation mode of the first imaging unit 101 from the imaging stop mode to the normal imaging mode, and ends the processing in FIG. 3.

In a case where it is determined that the image pickup apparatus 100 is moving based on the motion detecting result of the motion detector 103 (No in step S304), the imaging intent determining unit 105 determines that the photographer has no imaging intent and the flow returns to step S303. That is, in step S303, the control unit 106 repeats the determination by the imaging preparation start determining unit 104 as to whether or not the photographer has started the imaging preparation operation.

As described above, in this embodiment, in a case where the photographer has no imaging intent, the control unit 106 maintains the operation mode of the first imaging unit 101 as the imaging stop mode and achieves low power consumption of the image pickup apparatus 100. At this time, in a case where the operation mode of the first imaging unit 101 was the power saving mode, the control unit 106 may maintain the power saving mode or change it to the imaging stop mode. In a case where the photographer has an imaging intent, the operating mode of the first imaging unit 101 is automatically changed from the imaging stop mode to the normal imaging mode. This configuration saves the photographer's effort to set the image pickup apparatus 100 to an object imageable state and enables immediate imaging. At this time, the operating mode of the first imaging unit 101 may be automatically changed from the imaging stop mode to the power saving mode. That is, determining the state of the image pickup apparatus 100 and the state of the photographer can control the operating state of the image pickup apparatus 100 in accordance with the imaging intent.

The image pickup apparatus 100 may include a motion sensor 107 configured to acquire motion information such as acceleration, velocity, and angular velocity. In this case, the motion detector 103 may detect the motion of the image pickup apparatus 100 based on motion information acquired by the motion sensor 107. Due to this configuration in the embodiment, the motion detector 103 detects the motion of the image pickup apparatus 100 instead of or in addition to the calculation result of the motion vector between images acquired by the second imaging unit 102. As a result, the imaging intent of the photographer can be more accurately determined. For example, the imaging intent of the photographer can be more accurately determined by detecting the tilt of the image pickup apparatus 100 using the motion sensor 107 and by identifying the direction of the motion vector detected when the image pickup apparatus 100 is moved in the vertical direction.

In this embodiment, the imaging preparation start determining unit 104 performs the determining processing of the imaging preparation start and the imaging intent determining unit 105 performs the determining processing of the imaging intent, and the operating state of the image pickup apparatus 100 is controlled according to the imaging intent of the photographer. On the other hand, in an application of acquiring an image having a visual effect in which the background of the object appears to flow, such as in a panning shot, by moving the image pickup apparatus to capture images as if the photographer follows a moving object, an operation unit (not illustrated) may be provided to set whether or not the imaging intent determining unit 105 is to execute the determining processing of the imaging intent based on the absence of motion of the image pickup apparatus. The control unit 106 can also perform control in this embodiment according to the operation of this unillustrated operation unit. Furthermore, even when there is a predetermined motion such as a panning shot, it may be determined in step S304 that the photographer has an imaging intent. That is, the image pickup apparatus 100 may determine that the photographer has an imaging intent if there is a predetermined motion or if the image pickup apparatus 100 is not moving. In this case, to determine whether the motion is a predetermined motion such as a panning shot or another motion, the image pickup apparatus 100 may use any of a motion vector based on images acquired by the second imaging unit 102, a motion vector based on images acquired by the first imaging unit 101, and motion information acquired by the motion sensor 107. A known method may be used to determine whether the motion is the predetermined motion such as a panning shot or other motions. For example, the determination may be made based on whether a motion component in a predetermined direction (horizontal direction) is continuously detected for a predetermined period or longer.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide an image pickup apparatus that can determine the state of the image pickup apparatus and the state of the photographer, and control the operation state of the image pickup apparatus in accordance with the imaging intent of the photographer.

This application claims priority to Japanese Patent Application No. 2023-063096, which was filed on Apr. 7, 2023, and which is hereby incorporated by reference herein in its entirety.

What is claimed is:

1. An image pickup apparatus comprising:
a first imaging unit configured to acquire an object image;
a second imaging unit configured to acquire an image of the image pickup apparatus in an imaging area on a rear side of the image pickup apparatus;
a motion detector configured to detect a motion of the image pickup apparatus; and
a processor configured to control an operating mode of the image pickup apparatus based on the image acquired by the second imaging unit and a detection result of the motion detector,
wherein the processor is configured to set a first mode as the operating mode of the image pickup apparatus in case where the image acquired by the second imaging unit includes a predetermined feature and the motion detector detects that a period where a motion amount of the image pickup apparatus is less than a predetermined amount has continued for a predetermined period after a motion in a vertical direction of the image pickup apparatus by a predetermined amount or more.

2. The image pickup apparatus according to claim 1, wherein the motion detector detects the motion of the image pickup apparatus by calculating a motion vector between images acquired by the second imaging unit.

3. The image pickup apparatus according to claim 1, further comprising a motion sensor configured to acquire motion information about the image pickup apparatus,
wherein the motion detector detects the motion of the image pickup apparatus based on the motion information acquired by the motion sensor.

4. The image pickup apparatus according to claim 1, further comprising a first determining unit configured to determine that an imaging preparation operation for acquiring the object image has been started by the user in a case where the image acquired by the second imaging unit includes a feature portion of the user and the motion in the vertical direction of the image pickup apparatus by the predetermined amount or more detected by the motion detector.

5. The image pickup apparatus according to claim 1, wherein the processor controls a power state of the first imaging unit,
wherein the processor is configured to change the power state of the first imaging unit from a first state to a second state with power consumption higher than that of the first state in related to setting the first mode.

6. The image pickup apparatus according to claim 5, wherein the first mode is a normal imaging mode that enables the first imaging unit to acquire the object image, and
wherein the first state is related to a power saving mode in which power consumption is lower than that of the normal imaging mode, or an imaging stop mode that stops power supply to the first imaging unit.

7. The image pickup apparatus according to claim 5, wherein the processor maintains the power state of the first imaging unit in the first state in a case where the image acquired by the second imaging unit includes the predetermined feature, and the motion detector detects the motion in the vertical direction of the image pickup apparatus by the predetermined amount or more, but the period where the motion amount of the image pickup apparatus is less than the predetermined amount has not continued for the predetermined period.

8. A method of controlling an image pickup apparatus that includes a first imaging unit configured to acquire an object image, the method comprising:
an imaging step of acquiring an image of the image pickup apparatus in an imaging area on a rear side of the image pickup apparatus;
a motion detecting step of detecting a motion of the image pickup apparatus; and
a setting step of setting a first mode as an operating mode of the image pickup apparatus in case where the image acquired in the imaging step includes a predetermined feature, and detecting that a period where a motion amount of the image pickup apparatus is less than a predetermined amount has continued for a predetermined period after a motion in a vertical direction of the image pickup apparatus by a predetermined amount or more in the motion detecting step.

9. A non-transitory computer-readable storage medium storing a program for causing a computer to execute the method according to claim 8.

* * * * *